(12) United States Patent
Shelby

(10) Patent No.: US 6,314,140 B1
(45) Date of Patent: *Nov. 6, 2001

(54) DYNAMIC VIDEO FOCUS CONTROL

(75) Inventor: Kevin A. Shelby, Scotch Plains, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/581,640

(22) Filed: Dec. 28, 1995

(51) Int. Cl.[7] ........................................ H04N 7/18
(52) U.S. Cl. ............................ 375/240.26; 375/240.25
(58) Field of Search ........................... 348/14, 27, 401, 348/405, 409, 411, 419, 420, 700, 169, 170; 375/240.25, 240.26, 240.02

(56) References Cited

U.S. PATENT DOCUMENTS

| | | | |
|---|---|---|---|
| 3,825,832 | * | 7/1974 | Frei et al. ............................ 348/411 |
| 5,038,209 | * | 8/1991 | Hang .................................. 348/419 |
| 5,126,726 | * | 6/1992 | Howard et al. ...................... 345/138 |
| 5,202,759 | * | 4/1993 | Laycock .............................. 348/143 |
| 5,218,627 | * | 6/1993 | Corey et al. ......................... 379/53 |
| 5,270,811 | * | 12/1993 | Ishibashi et al. .................... 348/143 |
| 5,337,049 | * | 8/1994 | Shimoda .............................. 341/50 |
| 5,389,965 | * | 2/1995 | Kuzma ................................. 348/14 |
| 5,396,567 | * | 3/1995 | Jass .................................... 382/251 |
| 5,412,431 | * | 5/1995 | Vogel .................................. 348/405 |
| 5,430,480 | * | 7/1995 | Allen et al. ......................... 348/208 |
| 5,444,476 | * | 8/1995 | Conway .............................. 348/15 |
| 5,509,009 | * | 4/1996 | Laycock et al. .................... 348/15 |
| 5,510,834 | * | 4/1996 | Weiss et al. ........................ 348/97 |
| 5,521,634 | * | 5/1996 | McGary .............................. 348/169 |
| 5,592,226 | * | 1/1997 | Lee ..................................... 348/413 |
| 5,598,209 | * | 1/1997 | Cortjens et al. .................... 348/211 |
| 5,625,410 | * | 4/1997 | Washino et al. .................... 348/154 |
| 5,793,367 | * | 8/1998 | Taguchi .............................. 348/15 |
| 5,926,209 | * | 7/1999 | Glatt .................................. 348/143 |

* cited by examiner

Primary Examiner—Andy Rao
(74) Attorney, Agent, or Firm—Leo Stanger

(57) ABSTRACT

In a video camera the effects of global motion of a subject being photographed are accommodated by varying the pixel definition or focus of a digitally transmitted video image in response to frame-to-frame changes falling outside of a predetermined range. Specifically this is accomplished by sensing changes in the image content between successive images, determining whether the extent of that change lies within the predetermined range, and adjusting the pixel definition when the extent of change lies outside the range, and maintaining a given pixel definition when the extent of change remains within a predetermined range.

20 Claims, 4 Drawing Sheets

DYNAMIC VIDEO FOCUS CONTROL

FIELD OF THE INVENTION

This invention relates to dynamic video focusing controls for video cameras, and particularly to accommodating rapid changes in scenes being taken by video-telephone cameras operating on transmission lines with predetermined channel capacity.

BACKGROUND OF THE INVENTION

Video-telephone cameras have substantial capacity to capture the illumination over a number of pixel sites, and to divide the analog voltage representing the illumination amplitude at each pixel into a multiplicity of values represented digitally by a number of bits. They can also produce a large number of frames representing each image captured. The total number of bits per unit time then equals at least to the total number of bits per pixel times the number of pixels per frame times the number of frames per unit time.

The degree to which the amplitude of the analog signal appearing at each pixel site may be subdivided determines the pixel definition. For example, the amplitude may be divided into 128 values with 7 bits. This produces a fine gray scale gradation which a viewer may perceive as high definition and "fine" focus. On the other hand, dividing the analog amplitude at a pixel site into only two values with a single on off bit produces a high contrast that may be perceived as poor or "soft" focus.

Similarly, the frame rate can also be changed. A high frame rate assures smooth motion while a low frame rate may produce flicker or perception of jerky motion.

The capacity of a video-telephone camera to generate high bit rates from the product of the number of bits per pixel site, the number of pixels per frame, and the frame rate, exceeds the capacity of most transmission channels to carry the bit rate. Accordingly, a coder is used to reduce the number of pixel levels which the amplitude at any pixel site is divided, i.e. the number of bits per pixel sites, and/or the frame rate. The number of bits per pixel site is generally referred to herein as the pixel definition or focus. The coder selects a suitable pixel definition or focus relative to a particular frame rate on the basis of the channel capacity.

A typical coder operates according to a conventional CCITT standard. In that environment, the coder uses a predetermined relationship between pixel definition and frame rate. It is possible for the camera user to preset the relationship between the pixel definition or focus and the frame rate on the basis of the user's perception. However, such arrangement cannot accommodate rapid changes in scenes being taken without overloading the channel capacity or producing undesirable picture quality.

SUMMARY OF THE INVENTION

According to an embodiment of the invention video images are digitally transmitted by setting a pixel definition and a frame rate to a data stream of video images on the basis of available channel capacity, sensing changes in the content between successive image frames, determining whether the changes lie within a predetermined range, and adjusting the pixel definition if the changes lie outside the range.

The various features of novelty which characterize the invention are pointed out in the claims. Objects and advantages of the invention will become evident following the detail description when read in light of the accompanying drawings.

DETAILED DESCRIPTION OF PREFERRED EMBODIMENTS

Figure 1:
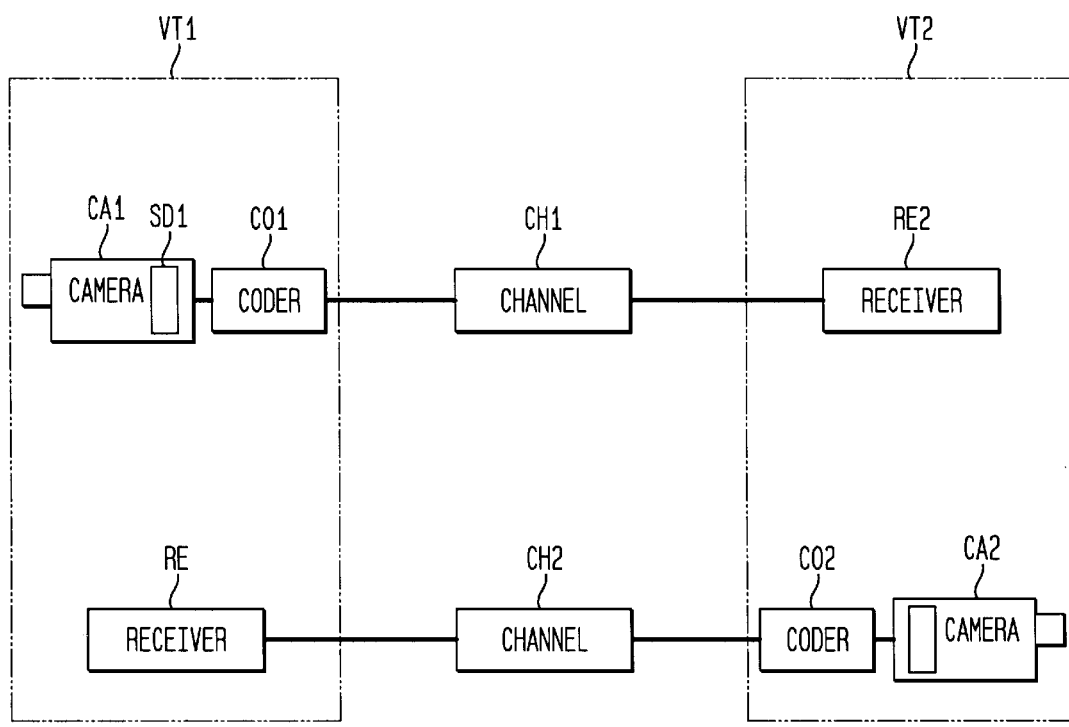
FIG. 1 is a block diagram of a system which constitutes an embodiment of the invention.

In FIG. 1, a video-telephone VT1 includes a camera CA1, a coder CO1 and a receiver RE1. The camera CA1 captures images on an internal photosensing device SD1 such as a CCD which produces a predetermined number of bits per pixel of information in the captured image. This results in a data stream composed of successive frames. At the camera output, the total number of bits per pixel is maximum and the frame rate is the maximum capable of being produced by the camera. The bit stream passes through the coder C01 and then a channel CH1 which may for example be a telephone link, to a video-telephone VT2 composed of a receiver RE2 a camera CA2 and a coder C02. The receivers RE1 and RE2 may take the form of a monitor or screen. In the video-telephone VT2, a camera CA2 and a coder C02 on the end of the receiver RE2 transmits through a channel CH2 to the second receiver RE1 at the end of the camera CA1.

The following description refers to the operation of the members CA1, C01, CH1 and RE2. The members CA2, C02, CH2, and RE1 operate in the same manner. Also the channels CH1 and CH2 may exist in a common connection or link.

The total bits per unit time, i.e. the total number of bits, times the total number of pixels, times the frame rate usually exceeds the capacity of the channel, i.e. the channel capacity, of the channel CH1. Accordingly, the coder CO1, which may be made a part of the camera or separate therefrom, is set to reduce the number of bits per pixel, or to reduce the frame rate, or to reduce both, so that the total bitrate lies within the channel capacity.

Reducing the pixel definition softens the focus. Increasing the pixel definition sharpens the focus. The frame rate may also be changed. A high frame rate produces the perception in the viewer of smooth motion on the screen. On the other hand, a low frame rate may result in the perception of jerkiness in the image when portions of the images are moving. The embodiments of the invention are based upon the understanding that a viewer will accept soft focus in a scene having substantial movement, but would require sharper focus for a still scene.

In the embodiment of FIG. 1, the coder CO1 determines the pixel definition and the frame rate on the basis of changes in the image content from image to image. In order to reduce the number of bits per frame, thereby allowing an increase in the bit rate or frame rate for a particular channel capacity, the camera CA1 or coder CO1 divides each frame into blocks. Each block typically represents an area of 8 by 8 pixels. The coder CO1 then determines if any change has occurred in any one block from one frame to the next frame. If no change takes place from one frame to the next, as may occur in blocks sensing a stationary background, the coder CO1 simply sends a no-change signal for that block. This avoids the need, in that frame to retransmit the bits representing the unchanged luminance level for the 8×8 or 64 pixel sites in that block.

If most or all blocks in a frame have unchanged luminous levels, the number of bits per pixel, i.e. pixel definition, or focus, can be made high for a particular frame rate. In one embodiment the coder CO1 sets the focus for each frame and sends a signal to the receiver RE1 indicating the focus, i.e. pixel definition, and frame rate. In another embodiment the coder CO1 divides the frame into sections, such as three sections, and sets a new focus for each section. The coder CO1 signals the receiver RE1 the focus for each section and the frame rate for each frame.

Figure 2:
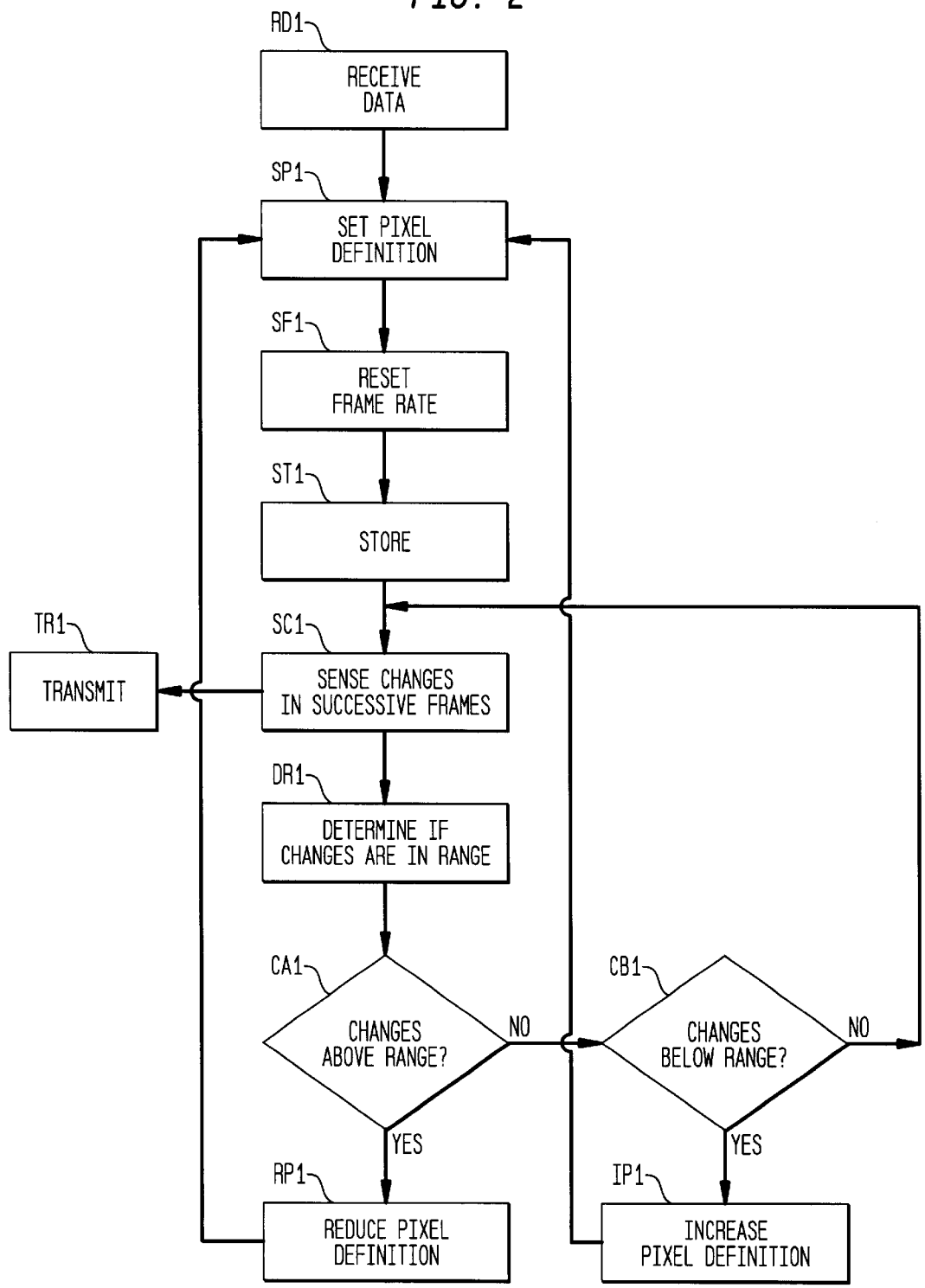
FIG. 2 is a flow chart of the operation of the system in FIG. 1.

The coder CO1 includes a microprocessor which achieves its ends as shown in the flow chart of FIG. 2 illustrating the operation of the coder CO1. In step RD1 the coder receives the data stream for the camera CA1. In step SP1, the coder CO1 sets a pixel definition or focus. At a start of an operation this could be preset at any value. In step SF1, the coder CO1 sets a frame rate on the basis of a pixel definition which conforms the frame rate to the channel capacity of the channel CH1. At the outset, the steps CO1 and SF1 may be reversed, i.e, the frame rate set first, or coincidental. In step ST1 the coder CO1 stores the contents of the blocks in the last frame generated. In step SC1, the coder CO1 senses the changes in the image content of corresponding blocks in succeeding frames. In step TR1 the coder CO1 transmits the data concerning the images. If there the image content of corresponding blocks in succeeding frames remains constant, that is, the image remains static, the coder CO1 in step ST1 merely transmits a signal to indicate no change. It does not resend the image content of the block. In this manner, it saves channel space. If there are changes in the block the coder CO1 transmits the changes in the block or retransmits the block. In step ST1 the coder CO1 also transmits details of how the image is quantized.

After transmission of signals representing all the blocks in a frame, the coder CO1 determines if the number of changed blocks lie within a predetermined range such as 20% to 80%. It does this by comparing the number of changed blocks with a high threshold and a low threshold that define the range. The high threshold may for example be 80% of all blocks, and the low threshold 20% of all blocks. In step CA1 the coder CO1 asks whether the number of changed blocks exceeds the high threshold. If yes, the coder CO1 proceeds to step RP which sends a reduce signal to step SP1 and resets the pixel definition or focus at a reduced value. If the answer is no, the coder proceeds to step CB1 where it asks whether the number of change blocks lies below the low threshold. If yes, it proceeds to step IP1 which sends an increase signal to step SP1 therefore sharpening the focus or increasing pixel definition. If the answer is no in step CB1, the combination of step CA1 and CB2 indicate that the number of changed blocks is within the predetermined range, i.e. between the thresholds, and the operation returns to step SC1 for sensing succeeding changes.

In yet another embodiment of the invention, the process is the same as in FIG. 2 except that the frames are divided into thirds as occurs in many video-telephone operations. In this embodiment, the pixel definition and focus may be changed after a third of each frame.

Because the changes in image content are determined on the basis of blocks of 8×8 pixels, the comparison is made of corresponding blocks of succeeding frames. Thus the coder CO1 maintains an entire frame in memory for comparing the blocks of the succeeding frame with the previous frame. As stated, if appropriate, in the transmit step TR1, the coder CO1 transmits a no change signal in place of the image content for each block at a time. In step SF1 the frame rate is determined by a known averaging or quantizing method based upon the numbers of changes of each block.

Figure 3:
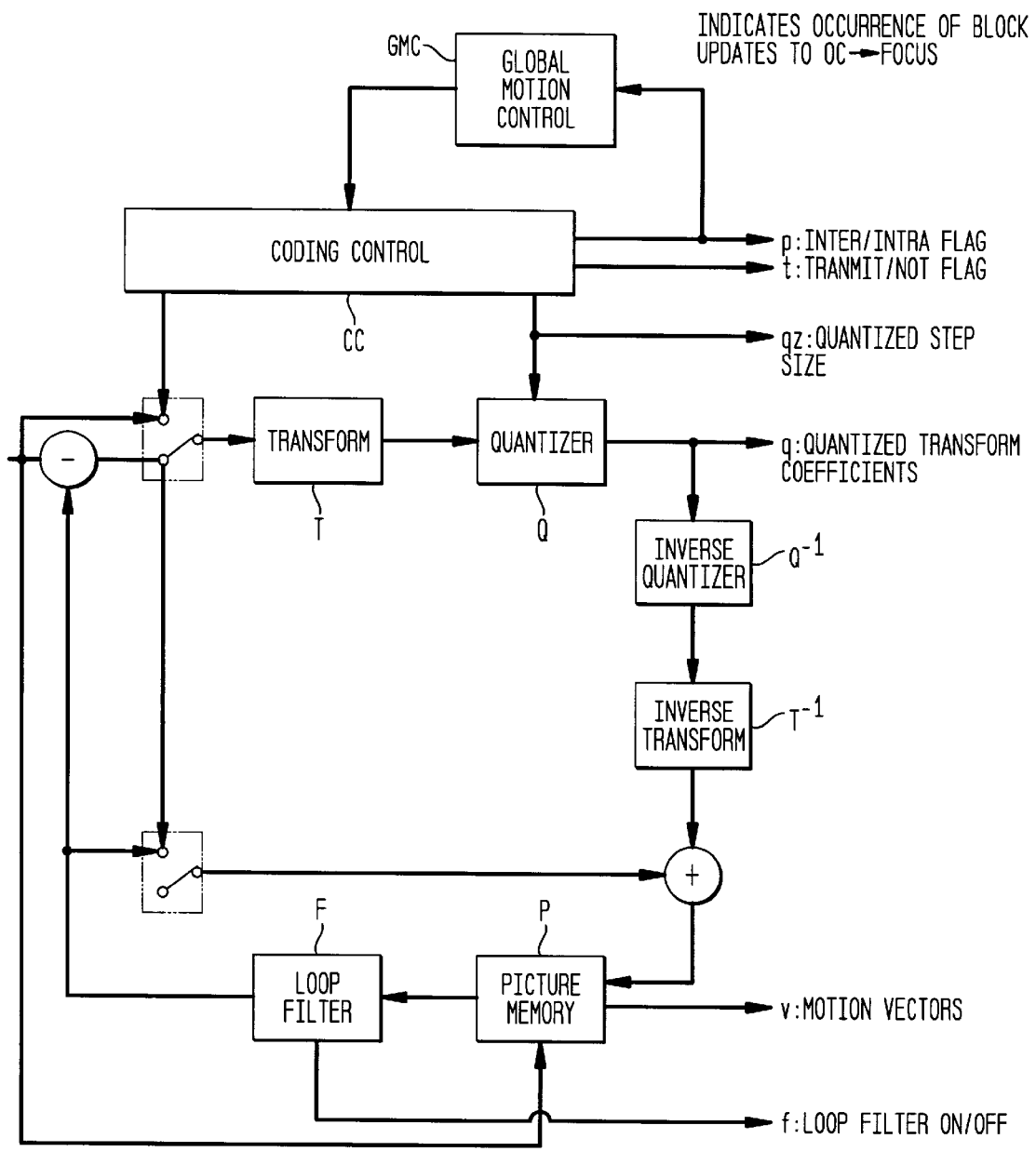
FIG. 3 is a diagram of the building blocks of an algorithm used in the system of FIG. 1.
Figure 4:
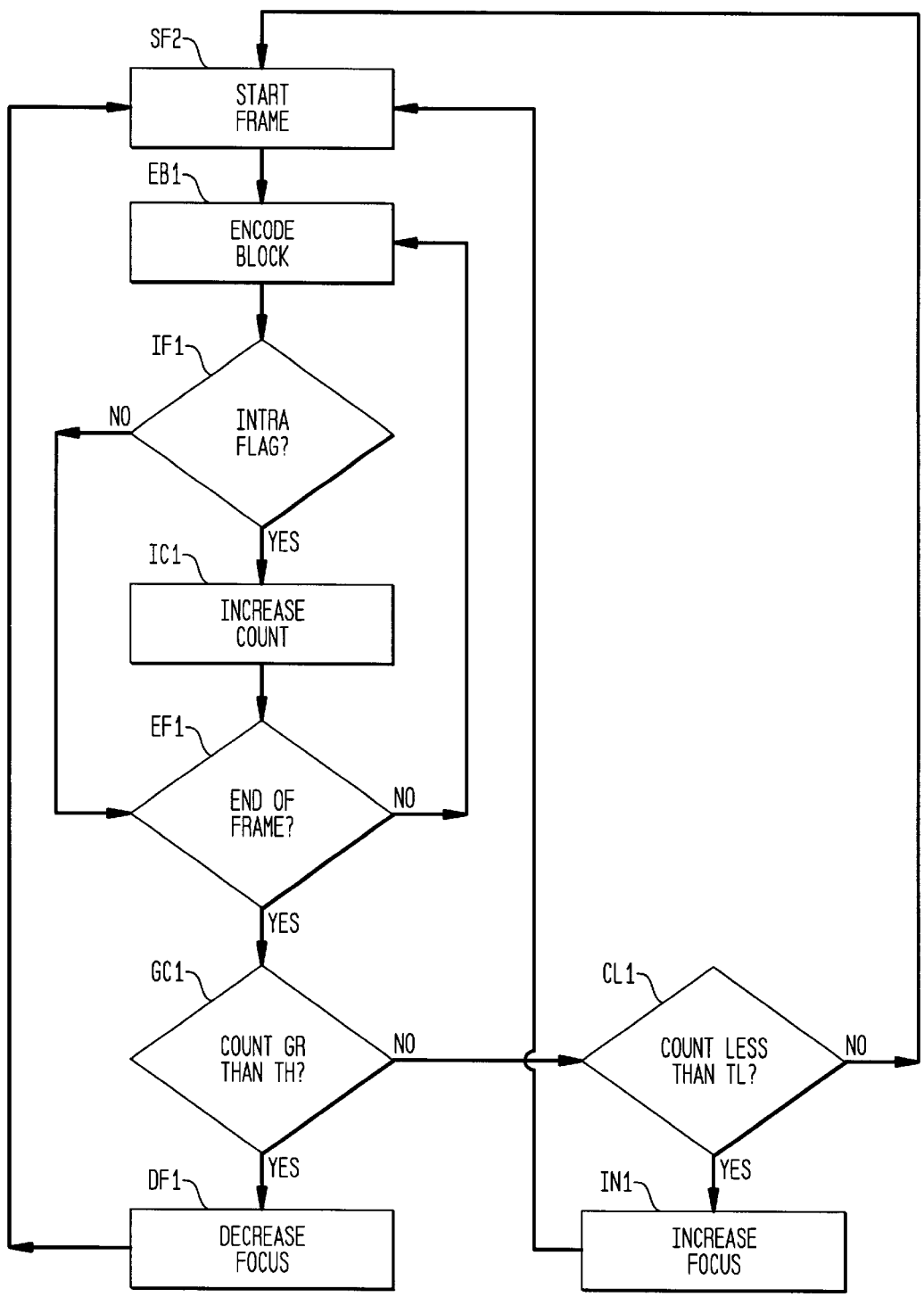
FIG. 4 is a flow chart of the operation of a block in FIG. 3.

FIGS. 3 and 4 illustrate the operation of the coder CO in more detail. FIG. 4 illustrates the building blocks of the operation of the coder CO1 showing a video transform coding algorithm. In FIG. 4 all the blocks but the global motion control GMC are those defined in CCITT standard COMX XV-R 37-E and known. Details of the block GMC appear in FIG. 4. FIG. 3 is composed of a transform T, a quantizer Q, a picture memory P with motion compensated variable delay, a loop filter F, a coding control CC, and inverse quantizer $Q^{-1}$, and an inverse transform $T^{-1}$. The primary building blocks are the transform T itself and the quantizer Q. This operation is well known and set forth in the aforementioned CCITT standard. Operated in a differential mode, the inverse quantizer $Q^{-1}$ and inverse transform $T^{-1}$ place a decoded copy of the previously transmitted image (i.e. frame) in the picture memory P to serve as a reference for coding in the next frame. Only those blocks that have changed significantly from frame to frame are transmitted to conserve bit rate.

The coding block CC maintains a constant channel rate amid widely varying scene content and bit rate generated by the coder. It does so by varying the coding quality (i.e. quantizer step size, frame rate) depending on the amount of data awaiting transmission relative to the channel capacity (i.e. buffer fullness).

The global motion control GMC serves as a feedback mechanism from which the coding control CC can determine the amount of global motion in the scene and adjust the focus setting accordingly. The global motion is estimated from the number of blocks that have significantly changed from one frame to the next. This is determined by the output p representing the inter/intra flag. Very few occurrences of the intraflag indicate relatively slow motion and the global motion control GMC sets guidelines for sharp focus. On the other hand, a large percentage of block changes indicate global motion and the global motion control GMC sets the guidelines for soft focus. The global motion control feedback mechanism removes all burdens of focus control from a user and provides a means for controlling the bit rate more consistently with scene content.

FIG. 4 illustrates the details of the global motion control GMC. Here, in step SF2 the global motion control GMC goes to the start of the frame. In step EB1 it encodes a block and in step IF, it asks whether the output p produces an intraflag i.e. an indication that the block image has changed significantly from the corresponding image in the last frame. If the answer is yes, the control GMC goes to step IC1 and increments the count. It then goes to step EF1 to ask if this is the end of the frame. If the answer in step IF1 is no, the control GMC also goes to step EF1 to ask if this is the end of the frame. If the answer is no, the steps EB1, IF1 and IC1 are repeated. If the answer is yes, that it is the end of the frame, the control GMC asks in step GC1 whether the intraflag count atp is greater than a predetermined value $T_H$. If yes, the control GC1 goes to step DF1 to decrease the focus. If the answer to step GC1 is no, the control GMC proceeds to step CL1, to ask whether the count is less than a threshold $T_L$. If the answer is yes, the control GMC increases the focus in step IN1. If the answer is no, the control GMC proceeds to the start of the frame. After step IN1 the control GMC also proceeds to start of the frame. The threshold $T_H$ may for example be 80%, that is 80% of the blocks in the image have changed. The focus is then decreased toward soft. If on the other hand the number of blocks falls below on a lower threshold such as 10% or 20% the image, the focus setting is increased toward sharp. The thresholds $T_H$ and $T_L$ define the range with which the number of significant changes are acceptable without need to alter the operator. Normally the scene content will change in 30% to 50% of the image area depending on the application, and the focus setting remains the same.

The predetermined range is set in the in the coder C01. The invention is not limited to the predetermined ranges and percentages mentioned. According to various embodiments of the invention, the ranges are set for particular circumstances dictated by the expected change in the scene, the channel capacity, and possibly the subjective values of the system designers or the user. The lower threshold may be set at values as low as one or two percent and as high as 60% or even higher. The higher threshold may be set as high as 90% and low as 30% or even lower. Of course the lower threshold must always be less than the higher threshold. According to an embodiment of the invention the coder contains manual setting knobs or rings that allow a user to change the thresholds that define the ranges.

The previous description refers to the operation of the members CA1, CO1, CH1 and RE2. As stated, the members CA2, C02, CH2, and RE1 operate in the same manner. Also the channels CH1 and CH2 may exist in a common connection or link.

The invention avoids the difficulties that arise in instances when the scene complexity does not match the focus setting at the coding control CC. This focus setting may be set by a user or may be preset. The invention avoids updating the entire scene at sharp focus during global motion and thus prevents consuming all of the available bit rate which would slow down the frame rate to the point of still images. The invention takes advantage of the loss of spatial fidelity is less evident during global motion. It sets the bit rate spent at soft focus and updates the images more frequently for better motion rendition.

The embodiments of the invention, during a relatively still scene, update the images at sharp focus and utilize the available bit rate by rendering fine spatial fidelity until motion resumes.

While embodiments of the invention have been described in detail, it will be evident to those skilled in the art that the invention may be embodied otherwise without departing from its spirit and scope.

What is claimed is:

1. A method of digitally transmitting video images in blocks, comprising:

setting a focus and a coordinated frame rate to a data stream of video images on the basis of available channel capacity;

said data stream having a plurality of successive frames, each frame having a multiplicity of blocks corresponding to blocks on the successive frames;

sensing changes by means of structural components, beyond a given difference, in image content between corresponding blocks of successive image frames; and softening, by means of the components and in the absence of manual intervention, the focus in response to the changes, beyond a given difference between corresponding blocks in successive frames, occurring in a number of blocks above a first predetermined number of blocks.

2. A method as in claim 1, wherein the frame rate is increased in response to the focus being softened, by means of the components and in the absence of manual intervention, and the frame rate is decreased and the focus is sharpened in response to the changes, beyond a given difference between corresponding blocks in successive frames, occurring in a number of blocks below a second predetermined number of blocks less than the first predetermined number of blocks.

3. A method as in claim 1, wherein the focus is a function of the bit rate per pixel.

4. A method as in claim 1, wherein each of said blocks contains an image content that constitutes a portion of the image content of the frame.

5. A method as in claim 4, wherein the step of softening the focus includes counting the number of blocks in each frame having changes, beyond a given difference in the image content from corresponding blocks of the previous image frames, and the step of softening the focus further includes softening the focus in response to the number of blocks having changes, beyond a given difference above a given number spread.

6. A method as in claim 5, wherein the step of sensing changes, beyond a given difference in image content between corresponding blocks, includes saving one image and comparing the blocks of one image with blocks of a successive image, by means of the components and in the absence of manual intervention,.

7. A method as in claim 1, further comprising transmitting a data stream on the basis of the frame rate and on the basis of the focus.

8. A method as in claim 4, further comprising transmitting a data stream on the basis of the frame rate and of a focus.

9. A method as in claim 5, wherein the first predetermined number of blocks is manually variable.

10. A method as in claim 5, wherein the transmitting step includes transmitting signals indicating no change from block to block in successive frames as a definition of the number of bits per pixel in blocks which having no changes, beyond a given difference, in successive images.

11. A system for digitally transmitting video images in blocks, comprising:

a coder responsive to a data stream of video images and having a given channel capacity for setting a focus and a coordinated frame rate on the basis of available channel capacity, and for dividing each frame into blocks corresponding to blocks on successive frames;

a comparator responsive, in the absence of manual intervention, to changes, beyond a given difference, in corresponding blocks of successive image frames;

a global motion control responsive, in the absence of manual intervention, to the number of blocks in a frame having changes, beyond a given difference between corresponding blocks of successive frames, lying above a predetermined number of blocks, for softening the focus.

12. A system as in claim 11, wherein the global motion control includes means, in the absence of manual intervention, for increasing the frame rate while softening the focus and decreasing the frame rate and sharpening the focus in response to the changes, beyond a given difference between corresponding blocks in successive frames, occurring in a number of blocks below a second predetermined number of blocks less than the first predetermined number of blocks.

13. A system as in claim 11, wherein the focus is a function of the bit rate per pixel.

14. A system as in claim 11, wherein each of said blocks contains an image content that constitutes a portion of the image content of the frame.

15. A system as in claim 14, wherein the global motion control, in the absence of manual intervention, counts the number of blocks in each frame having changes, beyond a given difference, in the image content from corresponding blocks of the previous image frames, and softens the focus in response to the number of blocks having changes, beyond a given difference, above a given number spread.

16. A system as in claim 15, wherein the comparator includes means for saving one image and comparing the blocks of one image with blocks of a successive image.

17. A system as in claim 11, further comprising means for transmitting a data stream on the basis of the frame rate and on the basis of the focus.

18. A system as in claim 14, further comprising means for transmitting a data stream on the basis of the frame rate and on the basis of a focus.

19. A system as in claim 15, wherein the first predetermined number of blocks is manually variable.

20. A system as in claim 15, wherein the transmitting means includes transmitting signals indicating no change from block to block in successive frames as a definition of the number of bits per pixel in blocks which having no changes, beyond a given difference, in successive images.

* * * * *